(12) United States Patent
Troncoso et al.

(10) Patent No.: US 8,401,779 B2
(45) Date of Patent: Mar. 19, 2013

(54) SEG (SMART ENERGY GATEWAY) FOR OPTIMIZED ENERGY FLOW CONTROL

(75) Inventors: Ignacio Alvarez Troncoso, Valls Tarragona (ES); Antoni Ferre Fabregas, Valls (ES); Jose Gabriel Fernandez, Valls (ES)

(73) Assignee: Lear Corporation, Southfield, MI (US)

( * ) Notice: Subject to any disclaimer, the term of this patent is extended or adjusted under 35 U.S.C. 154(b) by 340 days.

(21) Appl. No.: 12/782,220

(22) Filed: May 18, 2010

(65) Prior Publication Data

US 2010/0312430 A1 Dec. 9, 2010

Related U.S. Application Data

(60) Provisional application No. 61/184,988, filed on Jun. 8, 2009.

(51) Int. Cl.
*G06F 19/00* (2011.01)
*G06G 7/70* (2006.01)
*G06G 7/76* (2006.01)

(52) U.S. Cl. ...................................................... 701/123

(58) Field of Classification Search .................. None
See application file for complete search history.

(56) References Cited

U.S. PATENT DOCUMENTS

| 4,363,999 | A | * | 12/1982 | Preikschat | 318/53 |
| 5,913,180 | A | * | 6/1999 | Ryan | 702/45 |
| 6,434,475 | B2 | * | 8/2002 | Kaneko et al. | 701/112 |
| 6,661,108 | B1 | | 12/2003 | Yamada et al. | |
| 7,222,004 | B2 | * | 5/2007 | Anderson | 701/22 |
| 2001/0039230 | A1 | | 11/2001 | Severinsky et al. | |
| 2003/0104899 | A1 | | 6/2003 | Keller | |
| 2008/0100258 | A1 | * | 5/2008 | Ward | 320/101 |
| 2009/0259354 | A1 | | 10/2009 | Krupadanam et al. | |
| 2010/0114469 | A1 | * | 5/2010 | Chao et al. | 701/200 |
| 2010/0207454 | A1 | * | 8/2010 | Jagota et al. | 307/80 |

FOREIGN PATENT DOCUMENTS

| DE | 10252292 A1 | 6/2004 |
| DE | 102004009146 A1 | 9/2004 |
| DE | 102006035759 A1 | 2/2008 |
| DE | 60130484 T2 | 6/2008 |
| DE | 102008008238 A1 | 8/2008 |
| DE | 102008021045 A1 | 10/2008 |

OTHER PUBLICATIONS

German Office Action for corresponding Application No. DE 10 2010 029 743.7, mailed Jun. 22, 2012, 10 pages.
German Office Action for corresponding Application No. 10 2010 029 743.7, mailed Nov. 23, 2012, 8 pages.

* cited by examiner

*Primary Examiner* — Paul Danneman
(74) *Attorney, Agent, or Firm* — Brooks Kushman P.C.

(57) ABSTRACT

A smart energy gateway (SEG) operable to optimize energy consumption in a manner that optionally reduces user costs and/or emissions. The SEG may include a controller operable to manage energy distribution between one or more sources and one or more loads include within a vehicle according to one or more energy distribution schedules, such as but not limited to energy distribution schedules weight according to monetary and/or emission-based valuation metrics.

20 Claims, 5 Drawing Sheets

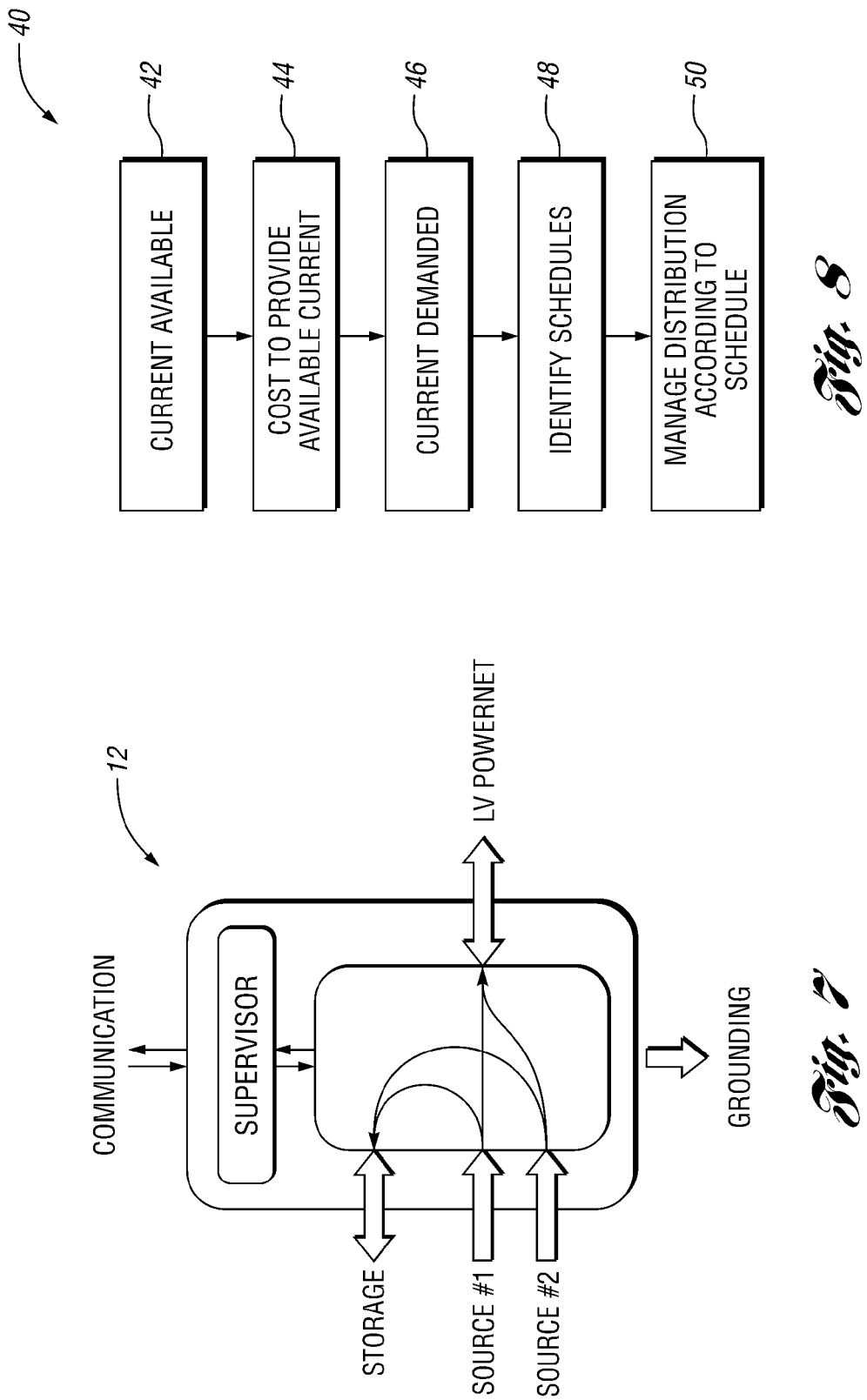

SEG (SMART ENERGY GATEWAY) FOR OPTIMIZED ENERGY FLOW CONTROL

CROSS-REFERENCE TO RELATED APPLICATIONS

This application claims the benefit of U.S. provisional Application No. 61/184,988 filed Jun. 8, 2009. The disclosure of which is incorporated in its entirety by reference herein.

TECHNICAL FIELD

The present invention relates to methods and system of managing electric energy flow, such as but not limited to a smart energy gateway (SEG) operable to optimize energy consumption in a manner that reduces user costs and/or emissions.

BACKGROUND

In present-day vehicles, a hot topic is the fuel consumption reduction. A well known system is the stop and start device, that stops the engine when the car is stopped at a traffic light, or the regenerative braking, that converts braking mechanical energy to electric energy. However, the simplicity of current electrical generation and distribution system in a car, using a single alternator and a single energy storage element (the battery) both connected to a single powernet, severely limits the possibilities to optimize the energy consumption. In accordance with one non-limiting aspect of the present invention, multiple generation (i.e. solar panel . . . ) and storage elements (i.e. ultracapacitors, second batteries . . . ) are used to provide a broad range of options opens to manage and optimize energy flow. This may be accomplished with a complete system interconnection and control that is optimized to achieve the best energy use benefit.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIGS. 3-7 schematically illustrates operation of the SEG in accordance with one non-limiting aspect of the present invention; and FIG. 8 illustrates a method for managing energy distribution within a vehicle in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
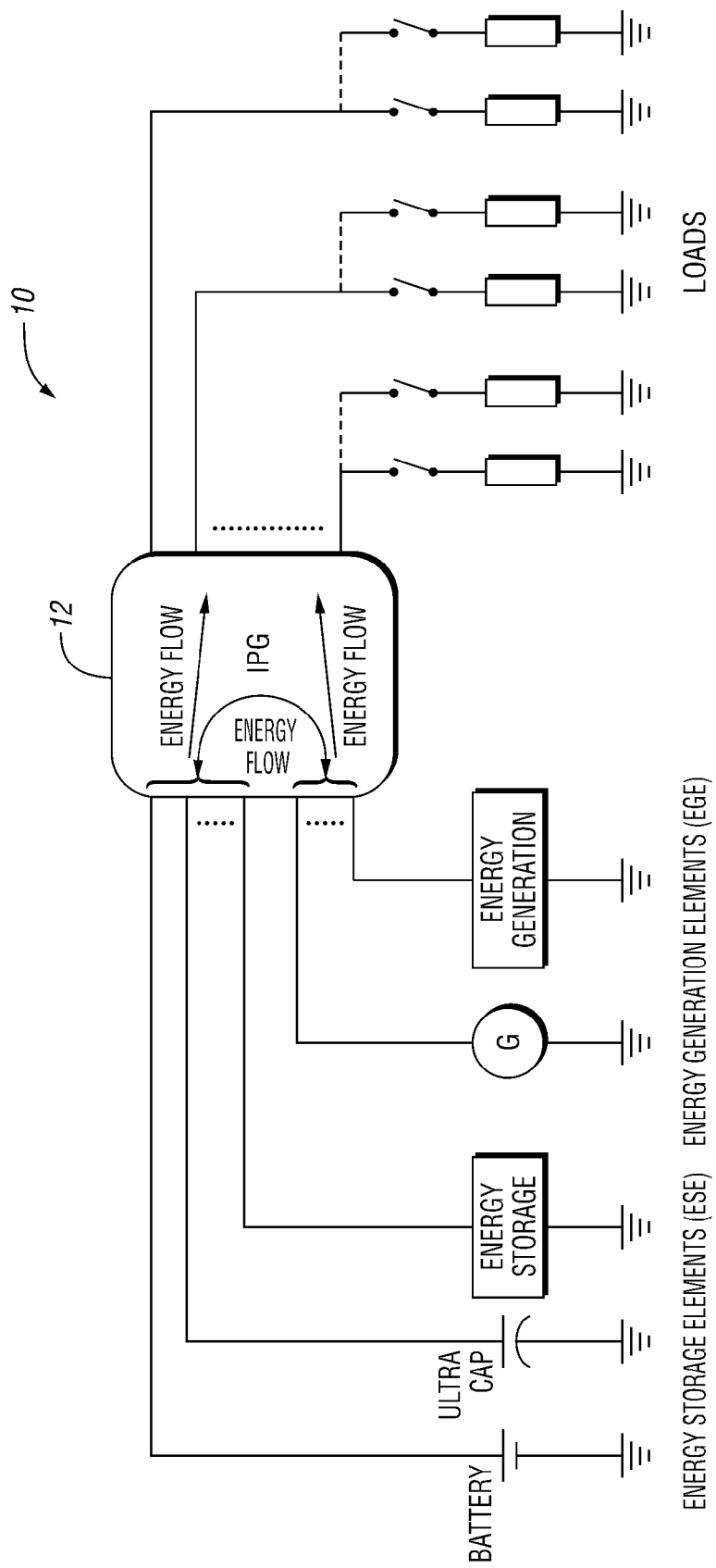
FIG. 1 illustrates an electrical system of a vehicle in accordance with one non-limiting aspect of the present invention.
Figure 2:
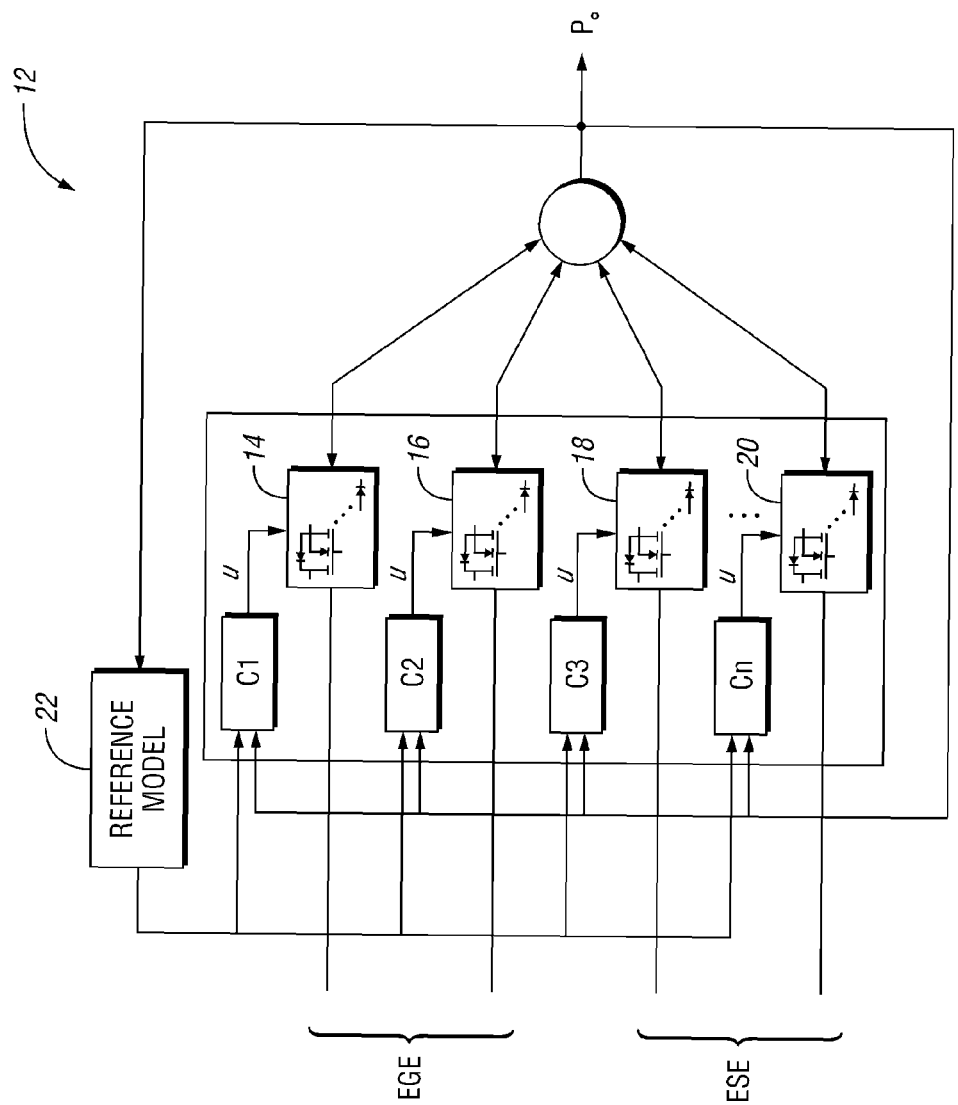
FIG. 2 illustrates an internal block diagram of a smart energy gateway (SEG) in accordance with one non-limiting aspect of the present invention.

FIG. 1 illustrates an electrical system 10 of a vehicle in accordance with one non-limiting aspect of the present invention. The system 10 is configured with multiple energy generation elements, energy storage elements and consumers or loads. FIG. 2 illustrates an internal block diagram of a smart energy gateway (SEG) 12 in accordance with one non-limiting aspect of the present invention. It comprises a series of power switches 14, 16, 18, 20 that are controlled by commands (C1, C2, . . . , Cn) according to a controller/supervisor 22 that monitors actual energy flow and vehicle conditions and uses this information to control the complete energy flow in the vehicle. Furthermore, this SEG 12 incorporates intelligence with real-time processing and memory capabilities to analyze and evaluate the typical (and different) driving profiles that the vehicle experiences. This information may then be used to optimize the energy generation and flows for fuel consumption reduction and $CO^2$ emissions minimization.

In particular, the SEG 12 may compute at any time which is the need of generated power, the best operating point for any of the generation sources, decide where to store the energy (in short-term or long-term storage elements) and schedule the energy consumption of the loads according to real driving conditions and analyzed information from previous driving cycles. Optionally, the system 10 may provide the right electrical power path to flow at any time for any real time driving condition among the different potential multi-voltage sources/storage/consumer networks.

Figures 3, 4:
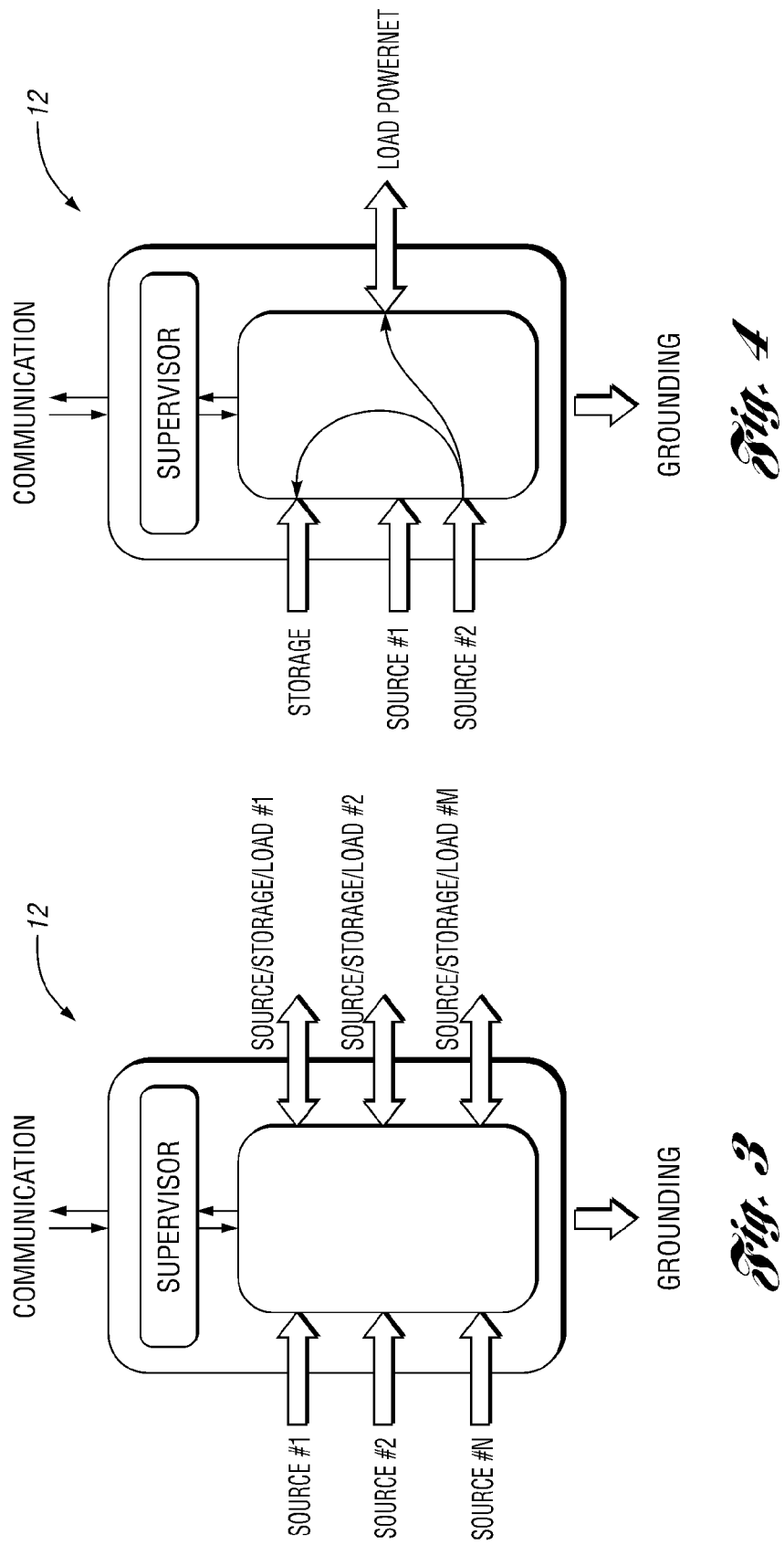

FIG. 3 schematically illustrates the SEG 12 in accordance with one non-limiting aspect of the present invention. The SEG 12 is shown to operate with three different types of energy agents: sources (such as alternators or solar cells) that always acts as inputs, and only require unidirectional power flow; other agents that can store and output energy, i.e., bidirectional devices, such as a storage element (battery or ultracapacitor), and a powernet with several elements connected (for instance, one or more loads, a lead-acid battery and an external charger); and loads (such as lights or DC motors) that always consume energy when operational.

The different working operation modes of the SEG 12 are directly linked to vehicle status. FIG. 4-7 illustrates examples of using the SEG 12 to efficiently control the different sources to provide demanded current to the loads, by choosing the most suitable combination of power sources at any driving situation. In order to simplify the drawings, the examples consider the SEG 12 operating with two source-type inputs (the alternator and another generation source such as a solar cell), one storage (bidirectional) input/output (a battery) and one load-type output.

Figure 5:
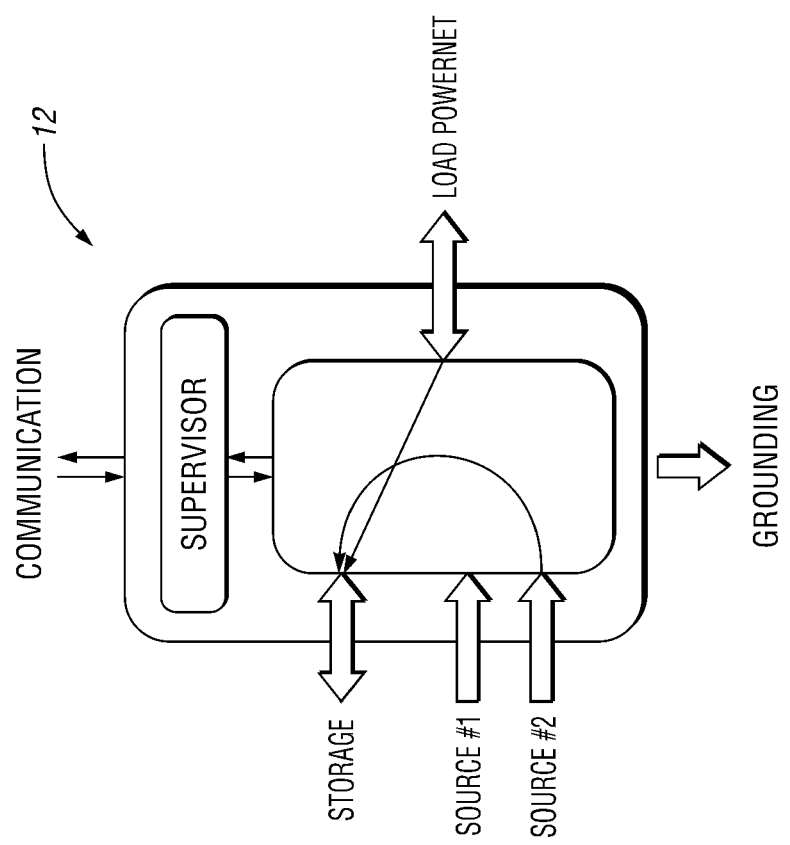

FIG. 4 illustrates a parking mode (engine Off) where the vehicle loads generate almost no consumption and the alternator is Off. In this scenario, if a source is available (for instance, a solar cell or a grid connection), the SEG 12 provides current to the load powernet (network used to carry current to the actively requesting loads) and, if the source generates more power than the power required by the load powernet, the excess can be used to recharge the battery or batteries present in the system. FIG. 5 illustrates a scenario during parking mode where the load powernet includes, in addition to the loads, other elements such as storage elements (battery, ultracapacitor) or generators (such as an external charger), that may be used to recharge the battery or batteries. If the load powernet has no elements capable to act as sources, this mode is not possible.

Figure 6:
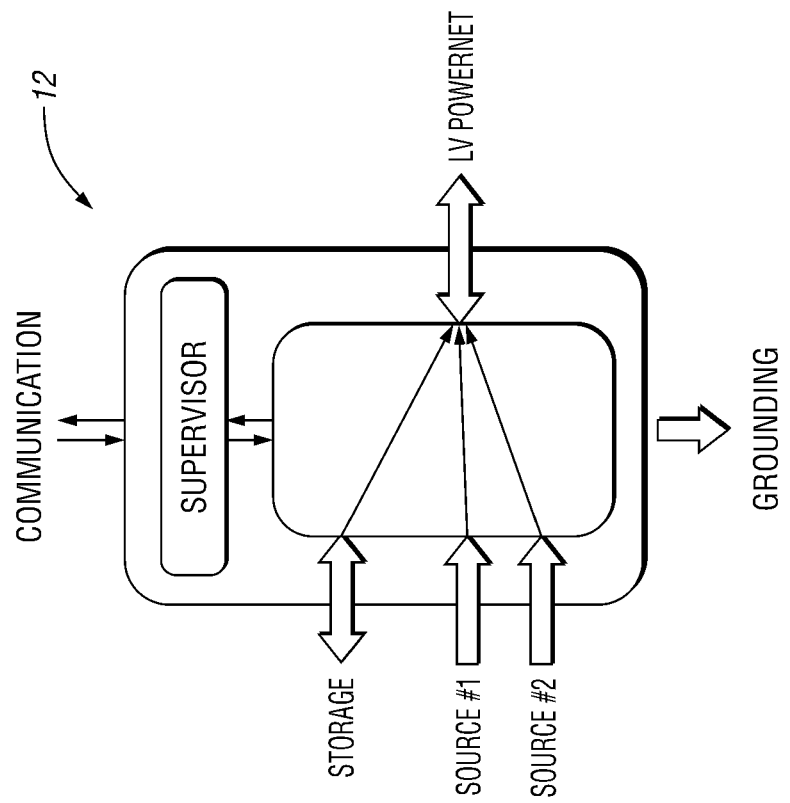

FIG. 6 illustrates a drive mode (engine on) where energy for supplying loads may be provided by a combination of sources available. In general, energy to the loads will be the sum of energy flowing from the source #1 (the alternator), the source #2 (a solar cell) and the storage element (the battery). Depending on the vehicle state, the energy efficiency of each source varies. For instance, at start and low speed, the alternator has low efficiency. Therefore, in this case, it may be more efficient for supplying the loads to use energy from some of the available sources (in this example the battery and the solar cell) while minimizing the energy extracted from other generation source (in this example, the alternator). The SEG 12 may assure that the state-of-charge (SOC) of the battery (or batteries) is kept above a specified minimum. At high speed, it may be more efficient to use energy from the alternator, since the efficiency of the alternator is very high. Depending on the efficiency map of each generation source, the SEG 12 monitors the load demand and extracts from each source a portion of the requested energy. If the energy generated by the (pure) sources is higher than the required load (for instance, a typical case is when regenerative braking is available), the extra generated energy may be used to recharge the battery (or batteries), as shown in FIG. 7.

One non-limiting aspect of the present invention contemplates controlling the energy flow between the different elements within a vehicle. While the present invention is not intended to be limited to any particular combination of energy devices, the present invention contemplates at least one application where the vehicle includes a solar energy source, a byproduct energy source, an alternator, and a passive energy source.

The solar energy source is operable to generate electric energy from solar energy, such as with the use of solar panels positioned on a surface of the vehicle exposed to the sun. The byproduct energy source, or sources, is operable to generate electric energy from so called "free" energy created as a byproduct of operating the vehicle, such as a thermoelectric generator that generates electric energy from the heat of exhaust gases, a generator that generates electric energy from vehicle vibrations, or a turbine that generates electric energy from air flow. The alternator is operable to generate electric energy from operation of a fuel-driven engine, such as from an internal combustion engine or fuel-cell used to propel the vehicle. The passive energy source is operable to store electrical energy and to output previously stored electrical energy, such as a battery or an ultracapacitor.

The present invention, however, is not intended to be limited to managing distribution of energy within a vehicle having only the noted energy devices. The present invention fully contemplates its application within vehicles having other energy sources. One additional energy source may be a braking generator used to generate electric energy from for regenerative braking, i.e., by relying on wheel rotation to turn the braking generator. The braking generator is not considered to be a "free" source of energy, even though it generates energy from operation of the vehicle, since the load it places on vehicle efficiencies can be selectively controlled whereas the loads placed on the vehicle by the "free" energy sources cannot be selectively controlled, i.e., the vibration, heat, and air flow over the vehicle occur at all times and the use thereof to generate electrical energy adds minimal if any additional inefficiency to the movement of the vehicle.

FIG. 8 illustrates a flowchart 40 method for managing energy distribution within a vehicle in accordance with one non-limiting aspect of the present invention. The method may be executed with a controller or other logically executing element issuing instructions sufficient to control the SEG or other device within a vehicle to facilitate implementing the operations necessary to achieve the actions contemplated by the present invention for managing energy distribution.

Block 42 relates to determining an amount of current available from each of the energy sources. The amount of available current may be based on current vehicle operating conditions, e.g., speed, load, terrain, etc. The amount of available current may be determined for each of the energy sources to reflect energy each source could provide should the vehicle continue to maintain its current state of operation. The amount of available current may dynamically change as the state of vehicle operation changes, such as if less energy is available for the solar source due to a change in cloud cover or increasing darkness, if the vehicle changes from city to highway driving, etc. The amount of current available from each of the sources may be continuously and/or dynamically updated with any changes in the state of vehicle operation and/or it may be automatically updated at predefined intervals.

Block 44 relates to determining a cost for each of the sources to provide current. The cost may be based on an amount per ampere, such as dollars per ampere, (or emitted $CO^2$ ppm). The table shown below illustrates an exemplary, monetary-based rate table for providing energy from a plurality of source based at least in part of current capabilities that fluctuate as a function of vehicle speed.

|  | Speed (MPH) | |
| --- | --- | --- |
|  | 10 | 20 |
| Solar | .5 A @ $0 | .5 A @ $0 |
| Byproduct | 1 A @ $0 | 1.1 A @ $0 |
| Alternator | 2 A @ 1 | 2 A @ $.5 |
|  | 4 A @ $1.5 | 4 A @ $1 |
|  | 6 A @ $1.75 | 6 A @ 1.25 |
|  | N/A | 8 A @ $1.5 |
| Passive | 3 A @ $charge | 3 A @ $charge |

The cost of each source to provide current may be based on the cost for the source to generate the available energy. This cost may vary depending on the operation of the vehicle. The cost to provide energy from the alternator, for example, may be based on an amount of fuel being consumed by the fuel-driven engine to operate the alternator. The efficiency of the alternator to convert the fuel to energy may vary depending on an amount of energy being produced and the operating conditions of the engine. The cost to provide energy from the byproduct sources may be considered to be zero since the energy is uncontrollably generated without intentionally increasing demands on the vehicle, although, like in the case of solar source, this might be intermittent (not fully reliable) depend on uncontrollable facts.

Instead of the cost to generate the energy at a given point in time, the cost may also be based on costs previously incurred to generate the energy. The passive energy sources, for example, are only able to provide stored energy. The costs previously incurred to charge the passive energy sources may be used as the cost to subsequently provide energy, at least for the purposes of Block 44. The cost to charge the passive energy sources may be kept over time in a memory. Because the passive energy sources may be periodically charged and discharged with differing amounts of energy, the cost may be determined to be an average for a predefined number of charging events. The predefined number of charging events may be based on the number of previous charging events used to achieve a current SOC of the passive energy source.

The cost for each source to provide the available current may also be calculated at different rates depending on operational settings of the corresponding energy source. For example, the amount of current available from each source may indicate all the current that can be drawn or provided therefrom while maintaining safe operational standards. At least in this sense, the amount of current represents a maximum amount of current that can be provided. In some case, one or more of the sources may be able to more efficiently provided current when operating at different levels of capacity. The alternator, for example, is able to provider current at a lower cost when operating below its maximum operating capabilities for the current vehicle operating conditions.

Block 44 may include determining the cost to provide the available current according to a rate that varies depending on the operating conditions of the source. The costs may include different values depending on whether the source is operating at or below its maximum capabilities for the current vehicle operating conditions. In the case of terrain dependent systems, the cost may be similar calculated depending on whether the vehicle is likely to be undertaking city or highway driving. The terrain may be determined from a travel map inputted to a global position system (GPS) or from an inference made based on past driving experiences, e.g., historical data representing a typical route taken to driver to work for the current time of day. Even more, whenever means are available to predict future vehicle status, like said navigation assistance devices based in GPS, or historical vehicle usage data, where the system may know that, for example, a long descent is approaching, (near future), this information may be used to improve energy usage optimization at present time, for example taking an extra energy (below a permitted threshold) from the battery because in short time the system will be able to re-charge it.

The values representing the cost to provide the amount of current may be input by a user, such as by a user inputting cost of fuel to drive the fuel-driven engine, and/or through a wireless message transmitted to the vehicle from a fueling source during a fueling operation where fuel is added to the vehicle. The cost may also be based on pre-assigned values for certain tradeoffs in vehicle performance. Providing energy from a regenerative braking element, for example, results in increased drag on the vehicle and a decrease in vehicle performance, i.e., load on the vehicle wheels is increased in exchange for generating energy. A value can be assigned to these and other events for the purposed of calculating the cost to provide the resulting energy.

Block 46 relates to determining current demanded by one or more vehicle loads. The demanded current may be based on the electric operating needs of any vehicle device (referred to in this context as a load). The demanded current may be based on a cumulative total of all the loads for the current vehicle operating conditions, and if not currently demanding current, the loads likely to be demanding current in the future, such as to maintain critical vehicle operating capabilities like re-start, alarm energizing, etc. Some of the vehicle loads included in the current demand determination may represent current required to properly operate an infortainment system, a heating system, a cooling system, a lighting system, and a safety system.

In some cases, some devices in the vehicle may fluctuate between being an energy source and a load. The passive energy sources, for example, may be such a device depending on its SOC. In the event the passive energy source is required to support vehicle re-start, for example, the source may require a minimum SOC in order to perform the re-start. The SOC may be used as a threshold to decide whether the passive energy source is able to provide current or is required to demand current.

The threshold may be varied depending on an age of the passive energy source, temperature and other factors relevant to meeting its desired operation. In the event the SOC is above the threshold, the passive energy source may be considered to have current available up to the threshold. In the event the passive energy source is below the threshold, such as if current had to be drawn beyond the threshold to support critical operations that could not be sufficiently supported by the other energy sources, the passive energy source may be considered to be load, at least up to the threshold.

Block 48 relates to identifying one or more schedules for providing the demanded current. The schedules may be based on different combinations of at least one of the energy sources providing current sufficient to meet the total demanded amount of current. Each of the schedules may be scheduled current to be provided from the one or more of the sources at different levels. The tables shown below illustrate possible schedules (bolded) for a demanded current of 5 A while the vehicle is traveling at 10 MPH.

| | Speed (MPH) | |
|---|---|---|
| | 10 | 20 |
| | Schedule #1 (7.5A @ $1.75) | |
| Solar | .5 A @ $0 | .5 A @ $0 |
| Byproduct | 1 A @ $0 | 1.1 A @ $0 |
| Alternator | 2 A @ 1 | 2 A @ $5 |
| | 4 A @ $1.5 | 4 A @ $1 |
| | 6 A @ $1.75 | 6 A @ 1.25 |
| | N/A | 8 A @ $1.5 |
| Passive | 3 A @ $charge | 3 A @ $charge |
| | Schedule #2 (5.5 A @ $1.5) | |
| Solar | .5 A @ $0 | .5 A @ $0 |
| Byproduct | 1 A @ $0 | 1.1 A @ $0 |
| Alternator | 2 A @ 1 | 2 A @ $.5 |
| | 4 A @ $1.5 | 4 A @ $1 |
| | 6 A @ $1.75 | 6 A @ 1.25 |
| | N/A | 8 A @ $1.5 |
| Passive | 3 A @ $charge | 3 A @ $charge |

Scheduled #1 would result in the energy sources being controlled to provide a total of 7.5 A at $1.75 per ampere. Schedule #2 would result in the energy sources being controlled to provide at total of 5.5 A at $1.5 per ampere. In each schedule, the amount of current is in excess of the demanded amount. The schedules may be identified with any number of combinations of the noted values and need not always result in excess current. The excess current schedules are shown merely to demonstrate opportunities for charging the passive energy sources and the attendant cost.

Assuming 5 A is taken to meet the current demands, schedule #1 results in 2.5 A being available to charge the passive energy source and schedule #2 results in 0.5 A being available. While schedule #1 is more expensive, it may be more desirable depending on the current SOC of the battery, i.e., if the battery is slightly below the threshold, it may be desirable to charge the battery. Within each schedule, the current drawn from each source may be directionally controlled to specific vehicle loads. In the event of a need to charge one of the passive sources, current from the byproduct source and/or solar source may be directed to the battery so that the more critical loads may be powered by the alternator. This may be beneficial since the solar energy may be less reliable due to variable weather conditions.

Schedule #2 may be selected in the event the lowest cost solution is desired since it results in the lowest total cost. Of course, other combinations, such as if the alternator were controlled to provide 3.5 A, may be schedule to further decrease the cost. Schedules #1 and #2 do not include the passive energy source as part of the current providing sources. This may be done to conserve operation of the passive energy source, in the event the passive energy source SOC is close to the threshold and/or in the event the costs to charge the passive energy source were too high to warrant its discharge under the current vehicle operating conditions.

Block 50 relates to manage distribution of current according to the one of the two schedules determined in Block. This may, for example, include managing energy distribution according to the scheduled (schedule #2) having a lowest cost based on the cost. Furthermore, depending on vehicle priority and safety policies, some loads might even be disconnected or partially powered, in order to prioritize the charging of the battery (considering a priority to ensure enough energy to start the engine in a near future).

Of course, any number of other metrics may be used to select the schedule to be used in managing energy distribution. For example, rather than selecting the schedules according to a monetary structure where the benefit of providing energy from one source or another is based on a monetary value, a similar control strategy may be implemented according to an emissions cost evaluation where the value, or cost, is set according to an amount of $CO^2$ emissions generated in producing the energy. The schedule having the lowest emissions costs, i.e. the schedule producing the least amount of emissions, may be selected.

Optionally, the emissions cost valuation may be used in cooperation with the monetary cost valuation to manage energy distribution. For example, in the event multiple schedules have the same monetary costs, or approximately the same cost (e.g., within 5-15% of each other), the schedule having the lower emission cost may be selected. The emissions and monetary cost valuations may also be combined according to emissions cost thresholds such that only schedules having an emission cost below a certain threshold may be considered when selecting the schedule having the lowest monetary cost.

To facilitate the contemplated emission-based valuation system, one or more emission sensors may be included and used to sense emission of the fuel-consuming sources (engine, fuel cell, etc.) while generating electrical energy. In the case of the passive elements, the emission costs to provide energy may be based on the emissions previously generated in charging the source.

As supported above, one non-limiting aspect of the present invention relates to a device, such as a Smart Energy Gateway (SEG), operable to fully control the energy flow within a vehicle. For example, the SEG may control different voltages and one or more current flows between different components of the electric distribution system (e.g., generators & sources, storage systems, consumers or other suitable components).

As supported above, non-limiting aspects of the present invention achieve an optimized system that may incorporate several generation sources and several storage elements. Optionally, the present invention is able to support one or more of the following capabilities:

power sources can have with different power and voltage/current variation range;

power sources can deliver power to the load individually or simultaneously;

current flowing from any source/storage element to any load/storage element should be always controllable; set up the appropriated energy flow path and transformation strategy to combine the multiple sources in one single power net line;

select the appropriate sources/storages supply configuration based on vehicle conditions for energy efficiency;

maximize efficiency conversion on "non-free" energy (i.e. energy obtained from fuel-consumption);

able to integrate control algorithms such as Maximum Power Point Tracking (MPPT) used for generation elements such as Photovoltaic or Thermo-Electric Generation arrays.

In accordance with one non-limiting aspect of the present invention, multiple generation (i.e. solar panel . . . ) and storage elements (i.e. ultracapacitors, second batteries . . . ) are used to provide a broad range of options opens to manage and optimize energy flow. This may be accomplished with a complete system interconnection and control that is optimized to achieve the best energy use benefit.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

What is claimed is:

1. A controller for managing distribution of electrical energy within a vehicle having a solar energy source operable to generate electric energy from solar energy, a byproduct energy source operable to generate electric energy from "free" energy created by operation of the vehicle, an alternator operable to generate electric energy from operation of a fuel-driven engine, and at least one passive energy source operable to store electrical energy and output previously stored electrical energy, the controller being operable to:

determine an amount of current available from each of the solar energy source, the byproduct energy source, the alternator, and the passive energy source based on current vehicle operating conditions, including vehicle speed;

determine a cost to provide the amount of current from each of the solar energy source, the byproduct energy source, the alternator, and the passive energy source for the current vehicle operating conditions, the cost for at least one or more of the solar energy source, the byproduct energy source, the alternator, and the passive energy source being determined to be greater when the vehicle speed is a first vehicle speed than when the vehicle speed is a second vehicle speed;

determine a current demand of one or more current consuming vehicle systems for the current vehicle operating conditions;

identify at least two schedules for meeting the current demand, each schedule including a different combination of at least one of the solar energy source, the byproduct energy source, the alternator, and the passive energy source providing at least a portion of the amount of current available therefrom; and manage distribution of current according to the one of the at least two schedules having a lowest cost based on the cost to provide current determined for each of the solar energy source, the byproduct energy source, the alternator, and the passive energy source.

2. The controller of claim 1 being further operable to determine the cost to provide the amount of current from the alternator based on a cost of a fuel used by the fuel-driven engine to generate the amount of current.

3. The controller of claim 2 being further operable to determine the cost of the fuel from signals generated by a user interface included with the vehicle in response to user inputs.

4. The controller of claim 2 being further operable to determine the cost of the fuel from a wireless message provided from a fuel source used to fill a fuel tank of the vehicle from which the fuel used by the fuel-driven engine is taken.

5. The controller of claim 1 being further operable to determine the cost to provide the amount of current from the passive energy source according to a cost previously accumulated to charge the passive energy source.

6. The controller of claim 5 being further operable to:
update the cost to provide the amount of current from the passive energy source after each time current is provided to the passive energy source as part of a charging event, the updated cost equaling an average cost for a predefined number of charging events; and
operable to set the predefined number of charging events to equal the number of previous charging events undertaken to achieve a current state of charge (SOC) of the passive energy source.

7. The controller of claim 1 being further operable to determine the cost to provide the amount of current from the solar energy source to be zero regardless of the amount of current available from the solar energy source.

8. The controller of claim 1 being further operable to determine the passive energy source to be included as one of the vehicle systems requiring current, and at least part of the current demand, whenever a state of charge (SOC) of the passive energy sources is below a predefined threshold and more current is available than the current demanded by the other vehicle systems.

9. The controller of claim 8 being further operable to determine the predefined threshold as a function of at least one of an age of the passive energy source, a temperature of the passive energy source, and an amount of current needed from the passive energy source to re-start the fuel-driven engine.

10. The controller of claim 1 being further operable to manage distribution of the current according to the one of the at least two schedules other than the schedule having the lowest cost based on an anticipated driving terrain of the vehicle, the cost for at least one or more of the solar energy source, the byproduct energy source, the alternator, and the passive energy source being determined to be greater when the anticipated driving terrain is a first terrain type than when the anticipated driving terrain is a second terrain type.

11. The controller of claim 10 being further operable with a global position system (GPS) used by the vehicle for navigation to determine the anticipated driving terrain of the vehicle.

12. The controller of claim 11 being further operable to determine based at least in part on the GPS whether the vehicle is to engage in highway driving or city driving, the controller operable to manage distribution of current according to the one of the at least two schedules other than the schedule having the lowest cost only in the event the vehicles is to engage in city driving, the first terrain type being highway driving and the second terrain type being city driving.

13. The controller of claim 1 being further operable to determine the cost to provide the amount of current from each of the solar energy source, the byproduct energy source, the alternator, and the passive energy source for the current vehicle operating conditions from a cost table, the cost table cross-referencing differing costs for at least one or more of the solar energy source, the byproduct energy source, the alternator, and the passive energy source to provide current at each of the first and second vehicle speeds.

14. A controller for managing distribution of electrical energy within a vehicle having a plurality of energy sources and a plurality of loads, the plurality of loads being powered by energy from the plurality of energy sources, the vehicle including a battery configured to be one of the energy source san done of the loads, the controller being operable to:
determine an amount of current available from each of the plurality of energy sources;
determine an emissions cost to provide the amount of current from each of the plurality of energy sources;
determine a current demand for each to be powered load for present vehicle operating conditions;
generate at least a first schedule and a second schedule for meeting the current demand at the present vehicle operating conditions, each of the first schedule and the second schedule including a different combination of at least one of the plurality of energy sources providing current, wherein a total emissions cost for the first schedule is greater than a total emissions cost for the second schedule, the total emissions cost for each of the first schedule and the second schedule comprising a summation of emissions costs associated with each of the plurality of energy sources providing current for the corresponding one of the first and second schedules; and
manage distribution of current according to the second schedule when a state of charge (SOC) of the battery is at least equal to a threshold SOC and according to the first schedule when the SOC is less than the threshold SOC.

15. The controller of claim 14 being further operable to determine at least a first load to be demanding current for the present vehicle conditions and to generate the first schedule such that the first load disconnected to prevent the first load from drawing current in order to in order to prioritize charging of the battery, the second schedule including providing current to the first load.

16. The controller of claim 14 being further operable to generate the first schedule based on an anticipated driving terrain of the vehicle such that the total emissions cost for the first schedule is a first amount when the anticipated driving terrain is downhill and a second amount when the anticipated driving train is uphill, the first amount being less than the second amount.

17. The controller of claim 14 being further operable to generate the first schedule based on a historical driving pattern for a driver identified to be currently driving the vehicle such that the total missions cost for the first schedule is a first amount when the driver is a first driver and a second amount when the identified driver is a second driver, the first amount being less than the second amount.

18. A smart energy gateway (SEG) for use in a vehicle having a plurality of energy sources and a plurality of loads, the SEG comprising
a plurality of power switches that are controlled by commands to control energy flow in the vehicle between the plurality of energy sources and the plurality of loads; and a controller operable to:
(i) determine an amount of current available from each of the plurality of energy sources;
(ii) determine a cost to provide the amount of current from each of the plurality of energy sources;
(iii) determine a current demand for each to be powered load;
(iv) generate a plurality of schedules for meeting the current demand, each schedule including a different combination of at least one of the plurality of energy sources providing at least a portion of the amount of current available from each; and
(v) command the plurality of power switches according to the one of the plurality of schedules having a lowest cost, wherein the schedule determined to have the lowest cost varies according to a current vehicle speed such that one of the schedules determined to have the lowest cost at a first vehicle speed is different from another one of the schedules determined to have the lowest cost at a second vehicle speed.

19. The SEG of claim 18 wherein the controller is further operable to:
(i) determine an emissions cost to provide the amount of current from each of the plurality of energy sources; and
(ii) to manage distribution of current according to the one of the at least two schedules having a lowest emissions cost in the event at least two of the plurality of schedules have approximately the same cost.

20. The SEG of claim 18 wherein the controller is further operable to assign a zero cost to at least one of the plurality of sources.

* * * * *

UNITED STATES PATENT AND TRADEMARK OFFICE
CERTIFICATE OF CORRECTION

| | |
|---|---|
| PATENT NO. | : 8,401,779 B2 |
| APPLICATION NO. | : 12/782220 |
| DATED | : March 19, 2013 |
| INVENTOR(S) | : Ignacio Alvarez Troncoso et al. |

It is certified that error appears in the above-identified patent and that said Letters Patent is hereby corrected as shown below:

In the Claims

Column 9, Line 67, Claim 12:
After "in the event the"
Delete "vehicles" and
Insert -- vehicle --.

Column 10, Lines 16-17, Claim 14:
After "to be one of the energy"
Delete "source san done" and
Insert -- sources and one --.

Column 10, Line 45, Claim 15:
After "from drawing current"
Delete "in order to".

Column 10, Line 58, Claim 17:
After "such that the total"
Delete "missions" and
Insert -- emissions --.

Signed and Sealed this
Twenty-fourth Day of September, 2013

Teresa Stanek Rea
*Deputy Director of the United States Patent and Trademark Office*